No. 692,586. Patented Feb. 4, 1902.
R. M. ALDRIDGE.
CORN AND COTTON PLANTER AND FERTILIZER DISTRIBUTER.
(Application filed Apr. 1, 1901.)

(No Model.) 2 Sheets—Sheet 1.

Witnesses
F. S. Belt,
Edgar M. Kitchin

Inventor
Reuben M. Aldridge
By
Beall & Fenwick
Attorneys

No. 692,586. Patented Feb. 4, 1902.
R. M. ALDRIDGE.
CORN AND COTTON PLANTER AND FERTILIZER DISTRIBUTER.
(Application filed Apr. 1, 1901.)
(No Model.) 2 Sheets—Sheet 2.
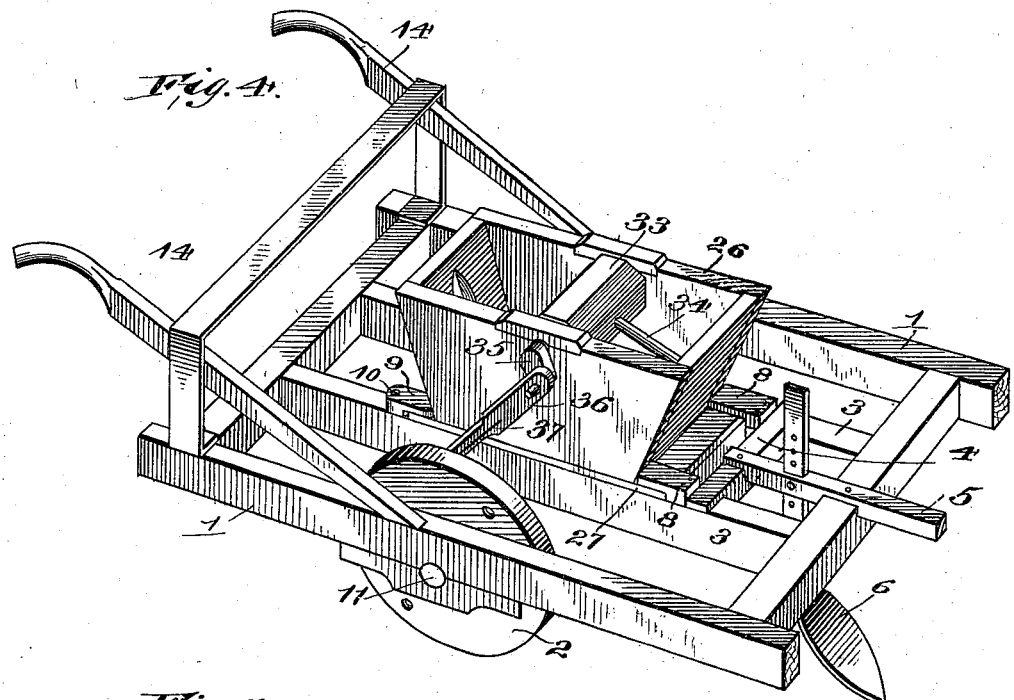
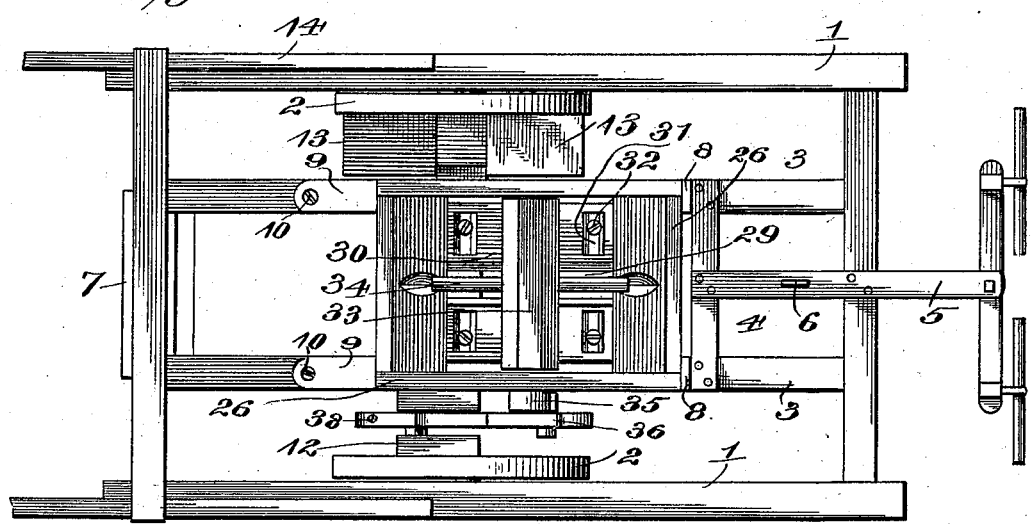
Witnesses
F. S. Belt,
Edgar M. Kitchin
Inventor
Reuben M. Aldridge
By Beall & Fenwick
Attorneys

UNITED STATES PATENT OFFICE.

REUBEN M. ALDRIDGE, OF WALTHALL, MISSISSIPPI.

CORN AND COTTON PLANTER AND FERTILIZER-DISTRIBUTER.

SPECIFICATION forming part of Letters Patent No. 692,586, dated February 4, 1902.

Application filed April 1, 1901. Serial No. 53,984. (No model.)

*To all whom it may concern:*

Be it known that I, REUBEN M. ALDRIDGE, a citizen of the United States, residing at Walthall, in the county of Webster and State of Mississippi, have invented certain new and useful Improvements in Corn and Cotton Planters and Fertilizer-Distributers; and I do hereby declare the following to be a full, clear, and exact description of the invention, such as will enable others skilled in the art to which it appertains to make and use the same.

This invention relates to improvements in seeders and planters, and more particularly to an interchangeably-convertible corn-planter, cotton-seed planter, and fertilizer-distributer.

It consists of a suitable frame, hoppers adapted to be removably and interchangeably applied thereto, dropping mechanism within each of said hoppers, and means carried by said frame for operating said mechanism.

It also consists of certain other novel constructions, combinations, and arrangements of parts, as will be hereinafter more fully described and claimed.

Figure 1:
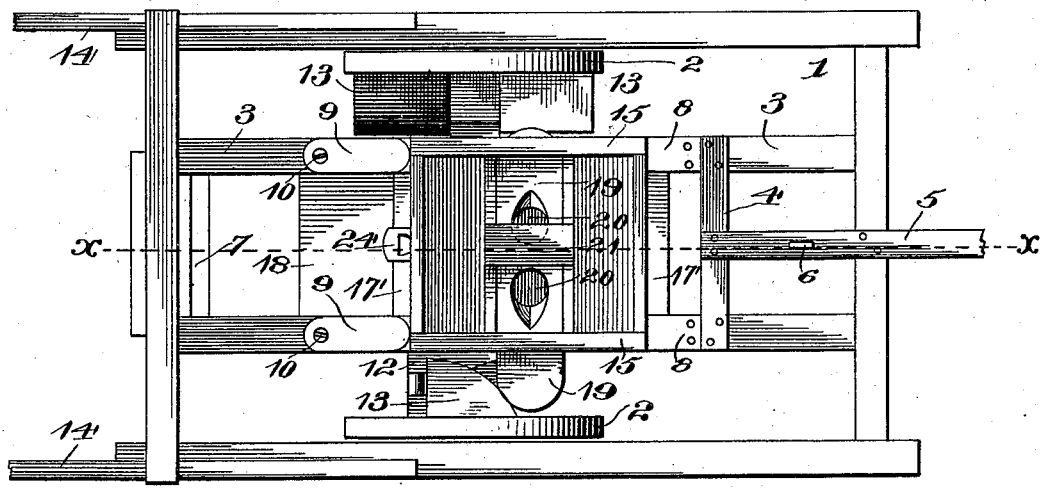
Figure 2:
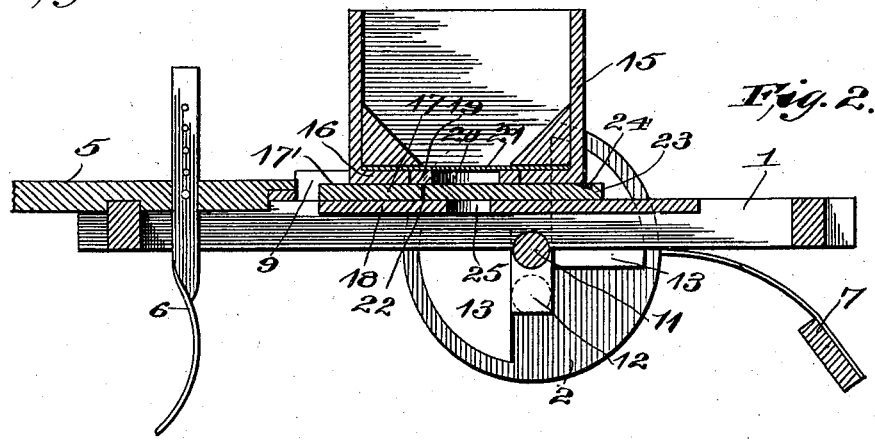
Figure 3:
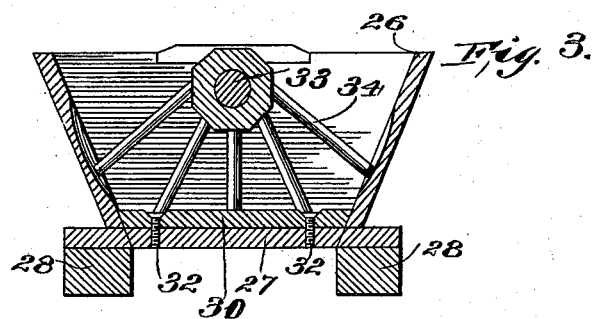

In the accompanying drawings, forming a part of this specification, Figure 1 represents a top plan view of a planter embodying the features of my invention. Fig. 2 represents a longitudinal vertical section of the parts shown in Fig. 1 and on line *x x* thereof. Fig. 3 represents a longitudinal vertical section through one of the hoppers. Fig. 4 represents a perspective view of my improved planter, the cotton-seed and fertilizer-distributer hopper being illustrated as attached thereto. Fig. 5 represents a top plan view of the same, and Fig. 6 represents a detail perspective view of one of the slide-operating cam-blocks.

Referring to the drawings by numerals, 1 indicates a framework of any suitable construction, and 2 the wheels therefor, said framework preferably comprising in part two parallel longitudinal beams, as 3 3, provided with a cross-beam, as 4, carrying any suitable draft apparatus, as 5. To the draft-pole 5 is preferably secured in any suitable manner a standard carrying a shovel or tooth of any preferred construction, as 6, which is adapted to open a furrow into which the seed or fertilizer is adapted to be dropped, and at the rear of the frame is provided any suitable coverer, as 7, which is adapted to fill in the furrow made by shovel 6.

In the rear of the cross-beam 4 and upon both of the parallel beams 3 are secured rearwardly-extending lugs, as 8 8, and near the rear ends of said beams 3 and extending longitudinally thereof are provided buttons, as 9 9, which buttons are adapted to be pivoted upon any preferred securing means, as 10. A shaft or axle, as 11, extends transversely of the frame 1 and is adapted to receive the wheels 2, which shaft finds any suitable bearings in said frame for the support thereof. The said shaft 11 is provided between the inner side of one of wheels 2 and the vertical plane of the outer side of the beam 3 with a crank, as 12, which is adapted to move with the revolution of the wheels and to pass said beam 3 without contact. Upon each wheel 2 and removably secured to the inner side thereof are provided a plurality of cam-blocks, as 13 13, which blocks are preferably arranged two upon each wheel, diametrically opposite each other upon each wheel, and the wheels are keyed or otherwise secured to shaft 11 with such relation to each other that the blocks 13 upon one wheel are always opposite the center of the space between the blocks 13 upon the other wheel, whereby one of said blocks 13 will appear above shaft 11 and in the vertical plane thereof at each quarter-revolution of said shaft, the said blocks appearing alternately upon the opposite sides of said frame 1. The blocks 13 upon the wheel corresponding with the end of the shaft 11, provided with crank 12, are removably secured to said wheel contiguous to said crank, the said crank not affecting the operation of said blocks. Any suitable handles, as 14, may be secured to frame 1 in any suitable manner. To this frame 1 with its attached parts, as just described, is adapted to be interchangeably applied a corn-dropping hopper or a cotton-seed and fertilizer-distributer hopper, whereby by the simple substitution of hoppers a plurality of operations may be obtained from the same general mechanism.

For the planting of corn I provide a hopper, as 15, which is provided with a primary bottom, as 16, whose edges extend to the vertical planes of the sides of said hopper, a second bottom, as 17, having its lateral edges in the same plane with the corresponding edges of the primary bottom and the front and rear edges extending slightly beyond said primary bottom, as at 17' 17', and a third bottom, as 18, which extends a corresponding distance to the front as the second bottom and preferably extends a considerable distance to the rear, said third bottom being of less width than the other two bottoms, whereby it is adapted to snugly fit between said parallel beams 3 when the hopper 15 is in position upon the frame 1, whereby lateral movement of the hopper is obviated, the extensions 17' 17' at the same time being retained beneath the lugs 8 8 and the buttons 9 9, the second bottom 17 resting upon said beams 3. The primary bottom 16 is preferably formed of two pieces, the inner edges of which are left far enough apart to form a transverse slot in which a slide, as 19, is adapted to operate, which slide is preferably of a width to fit snugly within said slot, whereby material within the hopper cannot enter the slot. Slide 19 is preferably provided with rounded or semicircular ends and with perforations, as 20 20, intermediate its length. A strip of material, as 21, preferably metal, is arranged above slide 19 and transversely thereof, which strip in operation prevents any material of greater thickness than the thickness of slide 19 to remain in either aperture 20 while said slide is passed beneath said strip 21. The second bottom 17 is also provided with a slot, as 22, which extends from the rear edge thereof to a point a short distance beyond the front edge of the slot in the primary bottom, and a slide, as 23, is adapted to fit snugly therein, the said slide 23 being imperforate and preferably provided with a notch or other suitable means for facilitating the withdrawal of the same. The third bottom 18 is provided with an aperture, as 25, which is adapted to register at all times with the squared aperture produced by the crossing of the slots in the primary and second bottoms, the slide 23 being adapted when the machine is not in operation to be passed fully within the slot in the second bottom, and thereby prevent the dropping of material from the hopper, and to be withdrawn when seed is to be dropped from the hopper, whereby by movement of slide 19 to a position permitting one of apertures 20 to register with the slot in the second bottom a grain of corn or other seed may be dropped through the aperture in the second bottom and through registering aperture 25 of the third bottom and thence to the ground.

For the sowing of cotton-seed or the distribution of fertilizer I contemplate applying to the frame 1 a slightly-different form of dropping mechanism, and it will of course be understood that I may employ for any of the operations any preferred form of hopper with its sides shaped and positioned as may be preferred. For the last-mentioned operation I provide a suitable hopper, as 26, which is provided with a bottom, as 27, the edges of which extend beyond the end walls of the hopper and are adapted to pass beneath lugs 8 8 and be secured by buttons 9 9, the said bottom resting upon the longitudinal parallel beams 3. The ends of bottom 27 are adapted to be supported by cross-bars, as 28 28, which cross-bars are of a length to fit snugly between beams 3, whereby the hopper 26 is firmly held in position upon the frame 1. A slot, as 29, is provided in the bottom 27 and runs longitudinally thereof. Within the hopper 27 are provided strips, as 30 30, extending longitudinally of slot 29 and provided with adjusting-slots 31 31 and screws 32 32, whereby the width of said slot 29 may be increased or decreased, as desired. Journaled in any suitable bearings near the top of hopper 26 is provided a shaft, as 33, which is adapted to carry any suitable number of stirrer-arms, as 34, and which is provided upon its reduced end, extending beyond the wall of hopper 26, with a crank, as 35, which crank is adapted to carry a pitman, as 36, the pitman in operation being secured at its opposite end to crank 12.

From the foregoing description the operation of my improved interchangeable seed-planter and fertilizer-distributer will be readily apparent to those skilled in the art. To use my improved planter as a corn-planter, the cam-blocks being secured to the wheels as described, I simply place hopper 15 upon the frame by passing the front projecting portion 17' of the bottom 17 beneath lugs 8 8 and turn buttons 9 9 above the rearwardly-projecting portion 17', whereby the hopper is firmly and securely held upon the frame 1. The slide 24 is withdrawn and the machine is in condition for planting corn, the cam-blocks being adapted to contact their curved faces with the curved ends of slide 19 alternately, whereby said slide will be thrown back and forth at each half-revolution of each wheel, thereby dropping the corn from within the hopper. Should it be desired to stop the dropping operation at any time, all that is necessary is to press slide 24 fully within its slot and the dropping-aperture is closed.

From the position of the elements just described to form a cotton-seed planter or fertilizer-distributer of my improved planter the hopper 15 is removed by turning the buttons 9 9 and releasing the parts, and hopper 26 is adjusted to the position previously occupied by hopper 15, the operation of securing hopper 26 upon frame 1 being the same as that in securing hopper 15. When hopper 26 has been secured upon frame 1, the cam-blocks 13 are removed from the wheel 2, corresponding with the side of the frame upon which crank 12 is found, and the pitman 36 is secured to said crank in any suitable manner, but preferably by having a slot, as 37, running centrally longitudinally thereof, which gives a spring effect to the bifurcated parts, which may be spread to admit said crank 12 to an aperture in the lower end of said pitman. (Not shown.) A screw, as 38, may be provided for securing the bifurcated parts of the pitman together after the said pitman has been applied. By the construction described I produce an oscillating movement of the stirrers 34 through the revolutions of wheels 2 and shaft 11 through the medium of the pitman 36 and cranks 12 and 35, whereby material within hopper 26 will be kept loose and dropping through slot 29.

Among the many advantages of my improvement is the provision of cam-blocks upon the wheels, which are adapted to strike the corn-dropping slide directly and give the same a positive movement.

Having thus fully described my invention, what I claim as new, and desire to secure by Letters Patent, is—

1. A planter, comprising in its construction a framework, traction-wheels supporting the same, rearwardly-extending lugs carried by said framework adapted to securely hold the front edge of a hopper, pivoted buttons secured to the frame and adapted to engage and retain the rear edge of a hopper, a plurality of hoppers having forwardly and rearwardly extending flanges for engaging said lugs and buttons so as to be capable of interchangeable application to said framework, one of said hoppers only being applied at a time, means within each of said hoppers for dropping the material contained thereby, and means for operating said dropping means, substantially as described.

2. A planter comprising a framework supported by suitable wheels, a hopper carried by said framework, and having a slotted primary bottom, an apertured secondary bottom, the edges thereof extending beyond the edges of the primary bottom, means carried by said framework for engaging said projecting edges for retaining said secondary bottom in position, a slide operating in the slot of said primary bottom for carrying the contents of said hopper into register with the aperture of the secondary bottom, and means carried by said wheels for operating said slide, substantially as described.

3. A planter, comprising a framework having longitudinal, parallel beams, and wheels supporting the framework, a hopper carried by said framework, consisting of suitable sides, a slotted primary bottom, a slide moving in said slot, an apertured secondary bottom, having its front and rear edges projecting beyond the edges of said primary bottom, and a third bottom formed with an aperture registering with the aperture of the secondary bottom, the said third bottom being secured to and of less width than the secondary bottom and adapted to fit between said parallel beams for preventing lateral movement of the hopper, the secondary bottom resting upon said framework, means carried by the framework for retaining said secondary bottom against longitudinal movement, and means for operating said slide for bringing the contents of the hopper into register with the apertures of the secondary and third bottoms, substantially as described.

4. A planter comprising a suitable framework supported by traction-wheels, a hopper supported upon said framework having sides, a slotted primary bottom, a secondary bottom beneath the primary bottom and formed with an elongated aperture extending transversely of the slot of the primary bottom, a slide operating within said aperture and adapted to close the same, a slide operating in the slot of said primary bottom and adapted to carry a quantity of the contents of said hopper into register with the aperture of the secondary bottom, means for limiting said quantity, and means for operating the slide of said primary bottom, substantially as described.

5. A planter, comprising a framework, traction-wheels at either side thereof carrying the same, an axle connecting and rigidly secured to said wheels and supporting said framework, a crank formed in the length of said axle near one of said wheels, cam-blocks secured to the wheel at the crank end of said axle having their flat faces resting against said crank, cam-blocks carried by the opposite wheel on that diameter of the wheel opposite that of the first-mentioned wheel occurring between the cam-blocks thereof, whereby rotation of said wheels will present alternate cam-blocks at each quarter-revolution, a hopper mounted upon said frame between said wheels, and a slide extending transversely thereof and operating within the same for dropping its contents, the ends of said slide projecting beyond the sides of said hopper and being adapted to be alternately struck by the said cam-blocks, substantially as described.

In testimony whereof I hereunto affix my signature in presence of two witnesses.

REUBEN M. ALDRIDGE.

Witnesses:
WM. P. POPE,
H. A. GOULD.